Patented Feb. 5, 1952

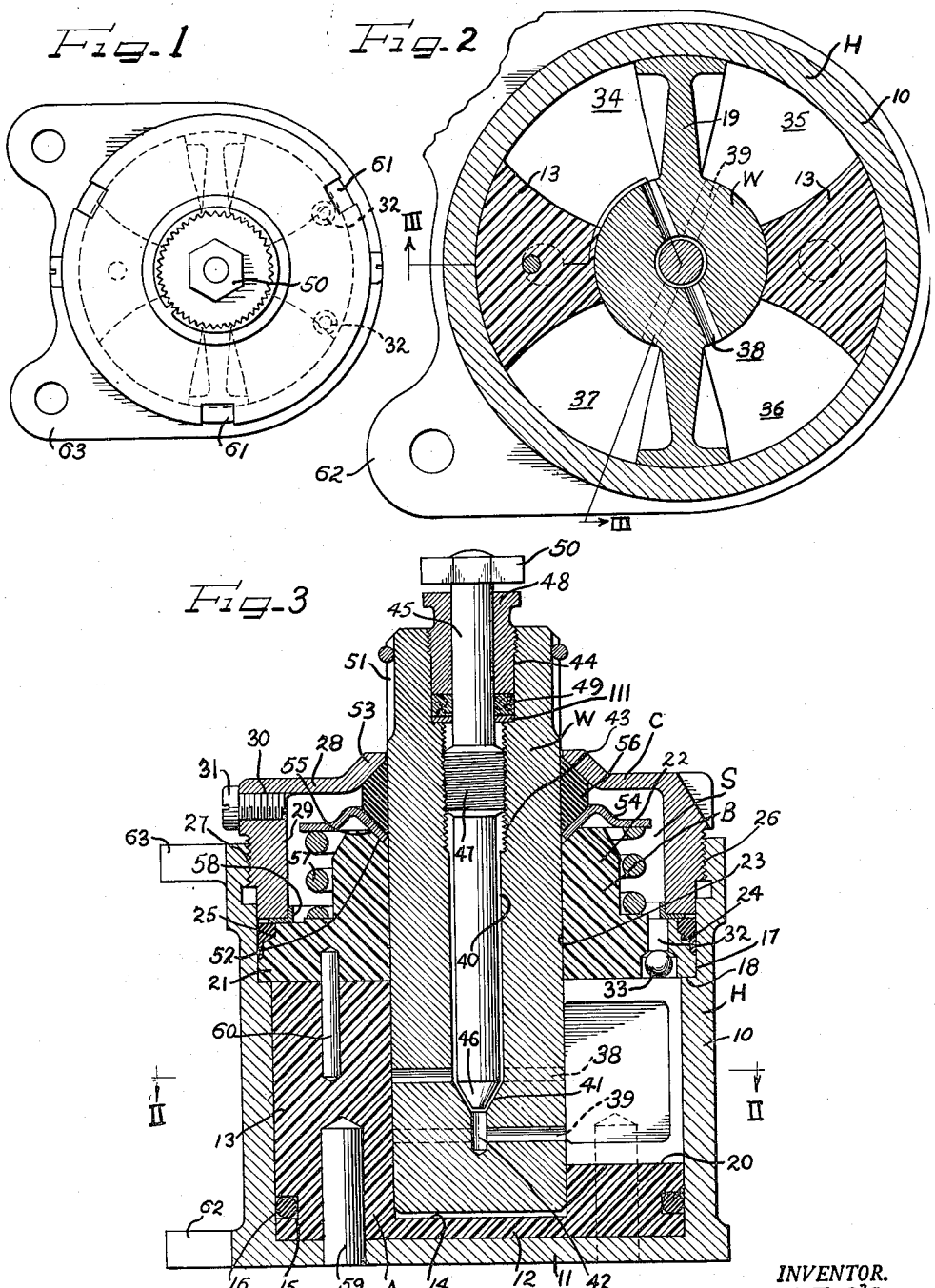

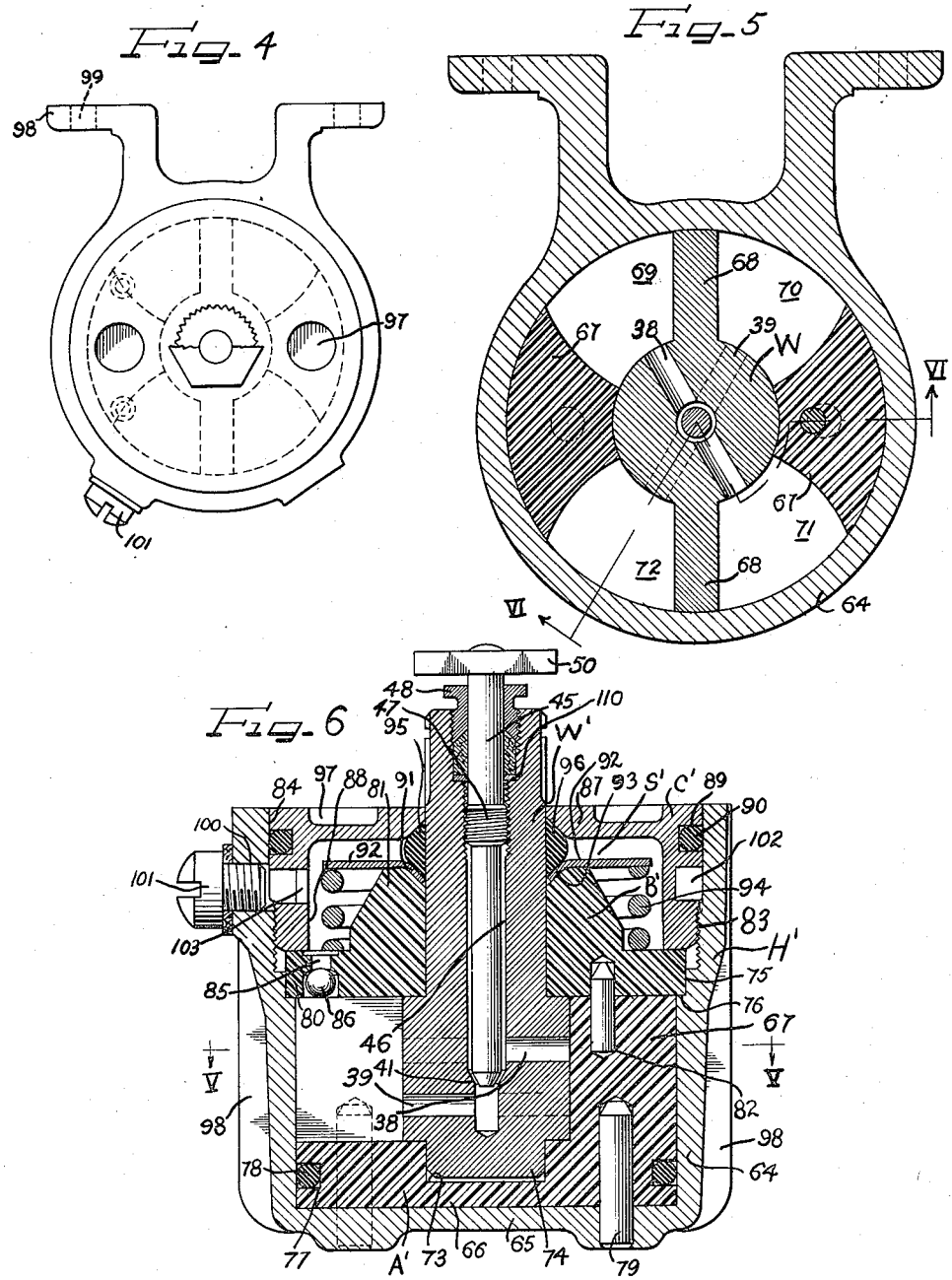

2,584,221

UNITED STATES PATENT OFFICE 2,584,221

ROTARY HYDRAULIC SHOCK ABSORBER

Bernard E. O'Connor, Buffalo, N. Y., assignor to Houdaille-Hershey Corporation, Detroit, Mich., a corporation of Michigan Application December 31, 1946, Serial No. 719,357

8 Claims. (Cl. 188—89)

The present invention relates to improvements in rotary hydraulic shock absorbers or dampers of the type in which a wing shaft is oscillatable within a housing providing working chambers between which hydraulic fluid is displaced under predetermined resistance to flow as determined by suitable valve structure.

A shock absorber of the type with which the present invention is concerned comprises an oscillatable wing shaft carrying a diametrically opposed pair of wings or vanes which oscillate between abutments or partitions and with such abutments or partitions define hydraulic fluid working chambers.

An object of the present invention is to provide a new and improved hydraulic shock absorber in which the component parts are simple and easy to make by economical mass production methods of manufacture, and which parts may be easily and rapidly assembled with full assurance that the structure will operate efficiently and accurately.

Another object of the present invention is to provide a hydraulic shock absorber structure in which the majority of parts can be made in automatic or semiautomatic machines.

A further object of the present invention is to provide, in a hydraulic shock absorber of the rotary type, a novel abutment flange member.

The invention has for an additional object the provision of an improved design of hydraulic shock absorber to facilitate manufacture and assembly.

A still further object of the invention is to provide, in a hydraulic shock absorber of the rotary type, a novel abutment flange member made entirely of plastic material.

Another and yet further object of the present invention is to improve rotary hydraulic shock absorber construction to eliminate some expensive precision machining operations.

The above, other and further objects of the present invention will be apparent from the following description and accompanying drawings.

Embodiments of the present invention are illustrated in the accompanying drawings and the views are as follows:

Figure 1 is a top plan view of a rotary hydraulic shock absorber embodying the present invention, with the arm for the wing shaft omitted;

Figure 2 is an enlarged horizontal sectional view taken in the plane of line II—II of Figure 3;

Figure 3 is a composite vertical sectional view taken on substantially the broken line III—III of Figure 2;

Figure 4 is a top plan view of a modified form of damper, with the wing shaft arm omitted, and with the valve actuating knob broken away to show certain details of construction;

Figure 5 is a horizontal sectional view taken in the plane of line V—V of Figure 6; and Figure 6 is a composite vertical sectional view taken substantially along the line VI—VI of Figure 5.

Referring to Figures 1 to 3, inclusive, the damper includes a housing or casing H which comprises a cylindrical wall 10 and an integral circular bottom 11.

An abutment flange member A is provided having a circular bottom 12 and with two diametrically opposed abutments 13 rising from the bottom 12. The bottom is counterbored at 14 for a purpose to be later explained.

Referring to Figure 2 it will be observed that the outer faces of the abutments 13 are arcuate, conforming to the curvature of the inner surface of the cylindrical wall 10 and fitting snugly thereagainst. The bottom wall 12 of the member A is of such a diameter as to fit snugly within the housing H and rests on the bottom 11. The inner faces of the abutments 13 are arcuate in horizontal section, and are diametrically spaced to receive between them a wing shaft as will be more fully explained. The opposite side surfaces of the abutments are curved, arcuately, with the inner faces of the abutments narrower than the outer faces, a construction well known in the art.

The periphery of the bottom 12 of the abutment flange member A is grooved at 15 to receive a ring gasket 16.

The inner surface of the wall 10 is counterbored at 17 to provide a ledge 18 the plane of which is at right angles to the axis of the housing. The ledge 18 is formed in the wall 10 and coincident with the upper ends of the abutments 13.

A wing shaft W is provided with two diametrically opposite vanes or wings 19 which extend radially to contact the inner surface of the cylindrical wall 10 of the housing. The length of the vanes 19 is such as to extend from the upper face 20 of the bottom 12 of the abutment flange member A and to a common plane with the upper ends of the abutments 13 and in register with the plane of the ledge 18 of the counterbore 17.

A closing flange member or intermediate wall member B is formed with a cylindrical base 21 and an axially extending hub portion 22, the outer diameter of which is less than the diameter of the base 21, as may be observed in Figure 3. The intermediate wall member B is axially bored at 23 to receive the wing shaft W. The intermediate wall member B is inserted in the housing H after the abutment flange member A has been installed, with the margin of the lower surface of the cylindrical base 21 resting on the ledge 18 of counterbore 17 in the housing. The lower surface of the base 21 of the intermediate wall member B, therefore, rests on the upper ends of the abutments 13 and the upper edges of the vanes 19 are in close surface contact.

The periphery of the base portion 21 of the intermediate wall B is formed with a groove 24 to receive a suitable packing 25 to prevent the escape of hydraulic fluid past the periphery of the intermediate wall member. Above the counterbore 17 the interior of the housing H is formed with another counterbore 26 of greater diameter, the surface of which counterbore is threaded at 27.

A flanged closure member C is provided, having a top 28 and a skirted flange 29. The exterior of the flange 29 is threaded to engage the threads 27 of the counterbore 26 to connect the closure member C to the housing H.

For introduction of hydraulic fluid into the unit, the flange 29 of the cover member C is provided with a laterally extending filling port 30 normally closed by a screw plug 31.

Referring to Figure 3, it will be noted that the closure member C and the intermediate wall member B are so formed and related as to provide a reservoir space S between them which constitutes a replenishing chamber, when the parts are assembled and in operative relation.

The base 21 of the intermediate wall member B is provided with passageways 32 therethrough. The passageways 32 are controlled by check valves 33, and afford flow communication of hydraulic fluid from the replenishing chamber S into the working chambers below the intermediate wall member B. When the working chambers are under compression the check valves will close the passageways, when the chambers are under suction hydraulic fluid will be drawn from the replenishing chamber S into the working chambers to compensate for any loss of fluid from the chambers.

Referring to Figure 2 it will be noted that the disposition of the abutments 13 and the relation of the vanes 19 is such as to define four working chambers 34, 35, 36 and 37.

Diametrically through the wing shaft W is a cross bore 38 affording flow communication between the chambers 34 and 36. Also through the wing shaft W is another cross bore 39, below the cross bore 38, to afford flow communication between the working chambers 35 and 37.

Axially of the wing shaft W is a bore 40, opening through the upper end of the shaft and terminating short of the lower end of the shaft. The lower end of the bore communicates with a countersunk opening 41 constituting a valve seat, which in turn communicates with a counterbore 42 of small diameter. The bore 40 communicates outwardly with an enlargement 43, the walls of which are threaded and which communicates in turn, outwardly, with a bore 44 of larger diameter, adjacent the upper end of the wing shaft W, a portion of which bore is threaded.

A needle valve member 45 is provided, having its lower end tapered at 46 as a valve for engaging the seat 41 to close passageway through it under certain conditions.

Intermediate the ends of the needle valve member 45 is a threaded enlargement 47 in threaded engagement with the bore 43 to adjust the needle valve member endwise as it is rotated in the bore.

An apertured plug or packing gland member 48 is threaded into the upper end of the bore 44. The plug has a bore through it to receive the needle valve member 45. Suitable packing means 49 is inserted between the inner end of the plug 48 and the shoulder formed at the junction of the bores 43 and 44, as may be observed in Figure 3. The plug 48 is screwed into the bore 44 to compress the packing 49 to prevent hydraulic fluid escape from around the needle valve 45 out through the upper end of the wing shaft W.

The upper end of the needle valve member 45 is provided with a head 50, which may be polygonal or otherwise, whereby the needle valve may be rotated to adjust flow of hydraulic fluid through the wing shaft W.

Referring to Figure 3 it will be observed that the cross bore 38 through the wing shaft W communicates with the bore 40 in the shaft immediately above the valve seat 41, and that the other cross bore 39 communicates with the bore 42 below the valve seat.

The upper end of the wing shaft W is provided with a plurality of flutes 51 whereby an arm may be connected to the shaft in a manner to prevent relative rotative movement between them and whereby the shaft may be oscillated in service.

The upper end of the hub 22 of the intermediate wall member B is countersunk at 52. The central portion of the top 28 of the closure member C is apertured to receive the wing shaft W and with the margins of the top defining the aperture conically offset as at 53.

Surrounding the wing shaft W is a spring retainer ring 54 having its central portion 55 deflected substantially complementary to the countersunk portion 52 of the hub 22, as may be observed in Figure 3. Between the deflected portion 55 of the spring retainer ring and the offset portion 53 of the top of the closure member B is a packing ring 56 which may be of trapezoidal form in cross section.

Surrounding the hub 22 of the intermediate wall member B is a spring 57 at one end resting on the upper surface of the bottom 21 of the intermediate wall B and at its upper end against the marginal portion of the spring retaining ring 54. The spring normally acts to move the spring retaining ring upwardly, as viewed in Figure 3, i. e., away from the base 21.

Interposed between the inner margin of the flange 29 of the closure member B and the upper surface of the base 21 of the intermediate wall member B is an angle washer 58 which may be observed in Figure 3.

In order to prevent relative rotative movement between the abutment flange member A and the housing H pins 59 are inserted through registering apertures and sockets in the bottom 11 of the housing and the abutments 13, respectively.

In order to prevent relative rotative movement between the intermediate wall member B and the housing dowel pins 60 are inserted in registering sockets in the upper ends of the abutment 13 and the lower surface of the base 21 of the intermediate wall member, as also may be observed in Figure 3.

To assemble the structure as shown in Figure 3, the abutment flange member A is inserted in the open end of the housing and is pinned by insertion of the pins 59. It is to be understood that prior to such insertion the gasket 16 has been applied in the groove 15.

Next the wing shaft W is applied with the wings 19 arranged between the abutment 13 as shown in Figure 2. Dowel pins 60 are inserted in the apertures in the abutments 13. The check valves 33 are held in the passages 32 while the intermediate wall member B is inserted with the apertures in the base 21 receiving the dowel pins 60, to thus angularly arrange the intermediate wall member in the housing. The angular arrangement of the intermediate wall member B is such as to position the passages 32 and check valves 33 over one end of one of the abutments 13, as may be noted in Figure 1.

Next, the angle washer 58 is applied. Spring 57 is then applied around the hub 22 and the spring retaining ring 54 applied atop the spring. The closure member C with the packing washer ring 56 is then applied with its flange engaging the threads 27 of the housing, whereupon the closure member is rotated to screw the closure member down into tight engagement against the flange of the intermediate wall member B. Such movement of the closure member C holds the base 21 of the intermediate wall member against the ledge 18 and in surface contact with the upper ends of the abutments 13 and the upper edges of the vanes 19. Tightening of the closure member C with respect to the housing will at the same time compress the packing ring 56 and packing 25.

Because of the manner of engagement of the packing ring 56 by the spring retaining ring 54 and the offset portion 53 of the cover the packing ring will be compressed axially and radially. The axial compression serves to make a fluid tight joint about the wing shaft W to prevent escape of fluid through the top portion 28 of the cover.

The cover or closure member C is provided, at circumferentially spaced intervals with shoulders or notches 61 whereby a suitable tool may be applied to the closure member to tightly thread it in the housing.

The housing may be provided with a plurality of apertured lugs 62 and 63, at its bottom and top respectively, providing means whereby the damper may be suitably attached to one of two relatively movable parts, as, for example, in a helicopter rotor assembly for damping movement of the rotor blades.

It will be noted from Figure 3 that the wing shaft W is of uniform diameter end to end, and its lower end is entered in the counterbore 14 in the bottom 12 of member A.

Referring to Figures 4, 5 and 6 there is shown a modified embodiment of the invention including a housing H' having a cylindrical wall 64 and an integral bottom wall 65. An abutment flange member A' is formed with a bottom wall 66 and upstanding diametrically opposed abutments 67.

A wing shaft W' is provided with two diametrically opposed vanes or wings 68 which co-operate with abutments 67 to define four hydraulic fluid working chambers 69, 70, 71 and 72.

The bottom 66 of the abutment flange member A' is axially recessed or counterbored at 73 to receive the reduced lower end 74 of the wing shaft W'. It will be noted from Figure 6 that the wing shaft W' is of greater diameter within the axial extent of the vanes 68.

The interior of the cylindrical wall 64 is counterbored at 75 to provide a ledge 76 in register with the upper ends of the abutment 67 and the upper edges of the vanes 68.

The abutment flange member A' is provided with a groove 77 at its periphery to receive a packing ring 78.

The abutment flange member A' is secured against relative rotative movement with respect to the housing H' by means of pins 79 entered through registering apertures and sockets in the bottom 65 of the housing and the abutment flange member A', as illustrated in Figure 6.

An intermediate wall member B' is provided with a cylindrical base 80 and a hub portion 81 of less diameter than the base, extending from one surface of the base.

After the abutment flange member A' has been applied and pinned, and the wing shaft W' has been inserted in the housing, the intermediate wall member B' is inserted, the margin of its lower face resting on the ledge 76 and against the upper ends of the abutments 67 and the upper edges of the vanes 68.

Relative rotative movement of the intermediate wall member B' with respect to the abutment flange member A' is prevented by dowel pins 82 entered in registering sockets in the upper ends of the abutment members 67 and the lower surface of the base 80 of the intermediate wall member.

Above the counterbore 75 the casing is counterbored at 83 and internally threaded. Above the threaded counterbore 83 is another counterbore 84, of greater diameter, the inner surface of which is plain.

The base 80 of the intermediate wall member B' is provided with passageways 85 in which are check valves 86.

A cover or closure member C' is formed as a casting, with a top 87 and a flange 88. Adjacent its lower end the flange 88 is threaded to engage the threaded counterbore 83 of the housing to connect the closure member to the housing. Formed in the closure member C' adjacent its top 87 is a peripheral groove 89 in which is a packing ring 90 to engage the plain inner surface of the cylinder bore 84 when the closure member is in place.

It will be noted that the construction and arrangement of the closure member C' and the intermediate wall member B' is such as to form a replenishment chamber S' so that the working chambers 69, 70, 71 and 72 may be at all times completely filled with a hydraulic fluid.

Referring to Figure 6, what is there shown as the upper end of the hub 81 is countersunk at 91. A spring retaining ring 92 which is flat except for a centrally deflected portion 93 is arranged with its deflected portion within the countersunk portion 91 of the hub. Between the cylindrical base 80 of the intermediate wall member B' and the spring retainer plate or ring 92 is a spring 94 whose function is to urge the spring retaining ring 92 away from the base 80 of the intermediate wall portion B'.

The central portion of the top 87 of the closure member C' is concavely relieved at 95 to form a countersunk portion. A packing ring 96 surrounds the wing shaft W' between the deflected portion 93 of the spring retaining ring 92 and the countersunk portion 95 of the closure member C'.

As the closure member C' is screwed into the upper end of the housing H' the packing ring 96 is compressed radially and axially to form a seal about the wing shaft W' against the fluid escaping through the closure member C'. The packing ring 90 seals the peripheral portion of the closure member C' against the upper margin of the housing H' so that when the closure member is tight, the housing is sealed against escape of fluid from its interior.

The upper surface of the top 87 of the closure member C' is provided with depressions 97 into which a tool may be inserted to rotate the closure member C' with respect to the housing H'.

In the form of the invention shown in Figures 4 to 6, the housing is provided with integral flanges 98 which are apertured to receive bolts or other suitable instrumentalities for securing the housing to one of two relatively movable parts when installed for use.

Referring to Figure 6 the wall of the housing H' is apertured near its top at 100 as a filler opening for supplying the replenishment chamber S' with hydraulic fluid. The opening is normally closed by a plug 101. The outer periphery of the flange 88 of the closure C' is formed with a groove 102 in register with the hole 100. The flange has aperture means 103 through which the fluid may be supplied to the chamber S'.

It will be observed that in both forms of the invention disclosed the abutments are integral with a member which also provides the bearing for the inner end of the wing shaft. In a sense the abutment member forms a secondary bottom for the unit which substantially reinforces the same to resist strong internal hydraulic pressures in service. Moreover certain machining problems during manufacture are advantageously simplified.

The abutment flange members A and A' and the closing flange or intermediate wall members B and B' are made of suitable plastic material formed by molding.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a hydraulic shock absorber device of the rotary type, including in combination, a cup-shaped housing comprising a bottom wall and a cylindrical wall; an abutment flange member comprising a bottom and integral abutments rising therefrom disposed within said housing with the bottom of said flange member against the bottom of the housing; means for preventing relative rotative movement of said abutment flange member and said housing; the inner surface of said cylindrical wall being provided with an annular ledge with its horizontal surface in register with the upper ends of said abutments; an intermediate wall member seated on said ledge and against the ends of said abutments to retain said abutment flange member in axial position in said housing; said intermediate wall member being centrally bored; a wing shaft extending through said bore and having wings thereon with their upper and lower edges in contact with said intermediate wall member and said abutment flange member bottom, respectively; a cover member removably connected to said housing and in contact with said intermediate wall member to hold the latter against said ledge and said abutments; and means for preventing relative rotative movement between said intermediate wall member and said abutment flange member.

2. In a hydraulic shock absorber device of the rotary type, including in combination, a housing comprising a bottom wall and a cylindrical wall, an abutment flange member comprising a bottom and integral abutments rising therefrom disposed within said housing with the bottom of said flange member against the bottom of said housing, the inner surface of said cylindrical wall being provided with an annular ledge with its horizontal surface in register with the upper ends of said abutments, an intermediate wall member seated on said ledge and against the upper ends of said abutments, and a cover member threaded into said cylindrical wall and in contact with said intermediate wall member to hold the latter on said ledge and against said abutments.

3. In a shock absorber device of the rotary type, including in combination, a cup-shaped housing comprising a flat bottom and a cylindrical wall, an abutment flange member comprising a bottom and integral abutments rising therefrom disposed within said housing with the bottom of said flange member against the bottom of said housing, the inner surface of said cylindrical wall being provided with an annular ledge with its horizontal surface in register with the upper ends of said abutments, an intermediate wall member seated on said ledge and against said abutments to retain said abutment flange member in place in said housing, said intermediate wall member being formed with a circular base and a hub of less diameter projecting from one surface of said base, a cover member threadedly connected to said cylindrical wall and having a generally cylindrical flange in endwise contact with said intermediate wall member to hold the latter on said ledge and against said abutments, the interior of said cover member being spaced from said intermediate wall member to provide therewith a fluid replenishing chamber, the base portion of said intermediate wall member having fluid passageway through it in communication with said replenishing chamber, check valve means in said passageway, means available through the cylindrical wall of said device and through said cylindrical flange for supplying fluid to said replenishing chamber and means for preventing fluid leakage from the casing past said cover member flange.

4. In a hydraulic shock absorber of the rotary type, a cylindrical cup-shaped housing, a separate abutment flange member disposed within said housing in relative non-rotative relation, said abutment flange member comprising a bottom resting against the bottom of the cup-shaped housing and two integral upstanding abutments to divide the housing interior into two fluid chambers, a wing shaft within said housing having two integral diametrically opposed vanes with a vane in each chamber and with the top edges of the vanes in register with the upper ends of the abutments, a ledge on the inner cylindrical wall of the housing at substantially the level of said upper ends of the vanes, and an intermediate wall member within said housing having bearing engagement with the upper ends of the abutments and the top edges of the vanes and having its margin on said ledge, and a closure member threaded into said housing to hold said intermediate wall member in place on said ledge.

5. In a hydraulic shock absorber device of the rotary type, including in combination, a cup-shaped housing comprising a bottom wall and a cylindrical wall; an abutment flange member formed entirely of molded plastic material comprising a bottom, and integral abutments rising therefrom disposed within said housing with the bottom of said flange member against the bottom of the housing; means for preventing relative rotative movement of said abutment flange member and said housing; the inner surface of said cylindrical wall being provided with an annular ledge with its horizontal surface in register with the upper ends of said abutments and with a wall flange rising substantially above said ledge; an intermediate wall member formed entirely of molded plastic material having its edge encompassed by said wall flange and seated on said ledge and against the ends of said abutments to retain said abutment flange member in axial position in said housing; said intermediate wall member having a bearing passageway through it; a wing shaft extending through said passageway and having wings thereon with their upper and lower edges in contact with said intermediate wall member and said abutment flange member bottom, respectively; a cover member removably connected to said housing and having a portion extending down into said wall flange and in contact with said intermediate wall member to hold the latter against said ledge and said abutments; and means for preventing relative rotative movement between said intermediate wall member and said abutment flange member.

6. A hydraulic shock absorber device of the rotary type, including in combination, a metallic housing comprising a bottom wall and a cylindrical wall, an abutment flange member formed entirely of molded plastic material comprising a bottom and integral abutments rising therefrom disposed within said housing with the bottom of said flange member against the bottom of said housing, the inner surface of said cylindrical wall being provided with an upwardly facing annular ledge with its horizontal surface in register with the upper ends of said abutments and an upwardly extending annular flange about said ledge, an intermediate wall member formed entirely of molded plastic material seated on said ledge and against the upper ends of said abutments and with its edge surrounded by said flange, and a cover member threadedly connected to said cylindrical wall and in contact with said intermediate wall member to hold the latter on said ledge and against said abutments.

7. In combination in a hydraulic shock absorber of the rotary type, a metallic cylindrical housing of generally cup-shape, a separate abutment flange member formed entirely of molded plastic material comprising a bottom and integral diametrically opposite abutments rising from said bottom, said abutment flange member being disposed within said housing with said bottom on the bottom of the housing and fixed in relative non-rotative relation, a wing shaft within said housing having two integral diametrically opposed vanes and cooperating with said abutments to divide the interior of the housing into a plurality of hydraulic fluid chambers, said abutments and said vanes having the top edges thereof in a common plane, said housing having an internal upwardly facing ledge disposed in said common plane and disposed substantially below the top of the outer end portion of the housing, an intermediate wall member formed entirely of molded plastic material disposed within said housing and resting against said ledge in said plane, means connecting said intermediate wall non-rotatably to the abutments, and a generally cup-shaped closure member secured within the outer end portion of said housing above said ledge and clamping said intermediate wall member against said ledge, said intermediate wall member and said closure member having coaxial openings therethrough for passage of the wing shaft outwardly beyond said vanes.

8. In combination in a hydraulic shock absorber of the rotary type, a metallic cylindrical housing of generally cup-shape, a separate abutment flange member formed entirely of molded plastic material comprising a bottom and integral diametrically opposite abutments rising from said bottom, said abutment flange member being disposed within said housing with said bottom on the bottom of the housing and fixed in relative non-rotative relation, a wing shaft within said housing having two integral diametrically opposed vanes and cooperating with said abutments to divide the interior of the housing into a plurality of hydraulic fluid chambers, said abutments and said vanes having the top edges thereof in a common plane, said housing having an internal upwardly facing ledge disposed in said common plane, an intermediate wall member formed entirely of molded plastic material disposed within said housing and resting against said ledge in said plane, and a generally cup-shaped closure member secured within the outer end of said housing and clamping said intermediate wall member against said ledge, said intermediate wall member and said closure member having coaxial openings therethrough for passage of the wing shaft outwardly beyond said vanes, said housing having an enlarged diameter counterbore outwardly of said ledge and said closure member having threaded interengagement with said housing in said counterbore.

BERNARD E. O'CONNOR.

REFERENCES CITED

The following references are of record in the file of this patent:

UNITED STATES PATENTS

| Number | Name | Date |
| --- | --- | --- |
| 1,269,519 | Benecke | June 11, 1918 |
| 1,790,310 | Kilgore | Jan. 27, 1931 |
| 1,910,049 | Peo | May 23, 1933 |
| 1,920,273 | Peo | Aug. 1, 1933 |
| 2,021,428 | Peo | Nov. 19, 1935 |
| 2,263,640 | Murrill | Nov. 25, 1941 |
| 2,298,396 | Magrum | Oct. 13, 1942 |
| 2,409,505 | Magrum | Oct. 15, 1946 |